(12) United States Patent
Franz et al.

(10) Patent No.: US 11,015,608 B2
(45) Date of Patent: May 25, 2021

(54) AXIAL FLOW PUMP WITH REDUCED HEIGHT DIMENSION

(71) Applicant: HEWLETT PACKARD ENTERPRISE DEVELOPMENT LP, Houston, TX (US)

(72) Inventors: John Paul Franz, Houston, TX (US); Tahir Cader, Liberty Lake, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 216 days.

(21) Appl. No.: 16/215,498

(22) Filed: Dec. 10, 2018

(65) Prior Publication Data
US 2020/0182251 A1    Jun. 11, 2020

(51) Int. Cl.
*F04D 25/06* (2006.01)
*F04D 25/16* (2006.01)
(Continued)

(52) U.S. Cl.
CPC ......... *F04D 25/0606* (2013.01); *F04D 13/06* (2013.01); *F04D 25/166* (2013.01);
(Continued)

(58) Field of Classification Search
CPC . F04D 3/00; F04D 3/005; F04D 13/06; F04D 19/002; F04D 25/06;
(Continued)

(56) References Cited

U.S. PATENT DOCUMENTS 5,220,804 A   6/1993   Tilton et al.
5,297,005 A   3/1994   Gourdine
(Continued)

FOREIGN PATENT DOCUMENTS

DE   20313438 U1   12/2004
JP   2004092610 A  *  3/2004   ............... F04D 3/02

OTHER PUBLICATIONS

Flowlink BV, "X-Series Micro Gear Pumps," 2017, 1-Page (online), Retrieved from the Internet on Jul. 1, 2018 at URL: <flowlink.nl/product-detail/x-series-micro-gear-pumps/>.
(Continued)

*Primary Examiner* — Charles G Freay
*Assistant Examiner* — Chirag Jariwala (57) ABSTRACT

An axial flow pump comprises a housing having a bore, a cylindrical permanent magnet within the housing bore, and at least one impeller inside the permanent magnet and adapted to cause fluid to flow within the cylindrical permanent magnet. The permanent magnet is configured to rotate in the bore around its longitudinal axis. A motor lamination stack surrounds the cylindrical permanent magnet. The motor lamination stack is formed substantially as a cuboid, extending in a width and height direction perpendicular to the axis of rotation of the cylindrical permanent magnet. The diameter of the bore is at least 80% of the dimension of the cuboid in the height direction. A coil of the motor lamination is configured to be energized and to create a rotating magnetic field in the lamination stack to rotate the cylindrical permanent magnet around its longitudinal axis. The coil is disposed to one or both sides of the pump.

22 Claims, 6 Drawing Sheets

(51) Int. Cl.
*F04D 29/00* (2006.01)
*F04D 29/046* (2006.01)
*H02K 21/18* (2006.01)
*F04D 29/20* (2006.01)
*F04D 29/40* (2006.01)
*H02K 7/14* (2006.01)
*F04D 29/18* (2006.01)
*F04D 13/06* (2006.01)

(52) U.S. Cl.
CPC ......... *F04D 29/007* (2013.01); *F04D 29/046* (2013.01); *F04D 29/181* (2013.01); *F04D 29/20* (2013.01); *F04D 29/406* (2013.01); *H02K 7/14* (2013.01); *H02K 21/18* (2013.01)

(58) Field of Classification Search
CPC ............ F04D 25/0606; F04D 25/0646; F04D 25/166; F04D 29/007; F04D 29/046; F04D 29/18; F04D 29/181; F04D 29/185; F04D 29/20; F04D 29/406; F04D 29/52; F04D 29/522; F04D 29/528; F04D 29/588; H02K 1/141; H02K 1/143; H02K 7/14; H02K 21/18; H02K 21/185
USPC ................................ 417/356, 423.7, 423.14
See application file for complete search history.

(56) References Cited

U.S. PATENT DOCUMENTS

| | | | |
|---|---|---|---|
| 5,422,787 A | 6/1995 | Gourdine | |
| 5,497,825 A | 3/1996 | Yu | |
| 5,559,673 A | 9/1996 | Gagnon et al. | |
| 5,566,377 A | 10/1996 | Lee | |
| 5,692,882 A | 12/1997 | Bozeman et al. | |
| 5,876,278 A | 3/1999 | Cheng | |
| 5,917,698 A | 6/1999 | Viallet | |
| 6,113,485 A | 9/2000 | Marquis et al. | |
| 6,148,907 A | 11/2000 | Cheng | |
| 6,288,897 B1 | 9/2001 | Fritschle et al. | |
| 6,402,612 B2 | 6/2002 | Akhtar et al. | |
| 6,527,521 B2 | 3/2003 | Noda | |
| 6,567,267 B1 | 5/2003 | Wang | |
| 6,755,626 B2 | 6/2004 | Komatsu et al. | |
| 6,885,555 B2 | 4/2005 | Greco | |
| 6,920,044 B2 | 7/2005 | Lin | |
| 6,940,716 B1 | 9/2005 | Korinsky et al. | |
| 7,177,151 B2 | 2/2007 | Van et al. | |
| 7,217,086 B2 | 5/2007 | Seko et al. | |
| 7,229,258 B2 | 6/2007 | Wood et al. | |
| 7,420,804 B2 | 9/2008 | Leija et al. | |
| 7,548,421 B2 | 6/2009 | Malone et al. | |
| 7,643,301 B1 | 1/2010 | Yu et al. | |
| 7,813,121 B2 | 10/2010 | Bisson et al. | |
| 7,813,129 B2 | 10/2010 | Van Der Werff | |
| 7,882,624 B2 | 2/2011 | Hu et al. | |
| 8,192,177 B2 | 6/2012 | Chin | |
| 8,430,156 B2 | 4/2013 | Malone et al. | |
| 8,963,396 B2 * | 2/2015 | Benner, Jr. ............ | H02K 33/16 310/216.022 |
| 9,223,362 B2 | 12/2015 | Watanabe et al. | |
| 9,625,220 B1 | 4/2017 | Ahbel et al. | |
| 9,810,207 B2 | 11/2017 | Daidzic | |
| 9,909,588 B2 | 3/2018 | Choudhuri | |
| 2001/0011007 A1 | 8/2001 | Akhtar et al. | |
| 2003/0051859 A1 | 3/2003 | Chesser et al. | |
| 2004/0079100 A1 | 4/2004 | Monfarad | |
| 2005/0135942 A1 | 6/2005 | Wood et al. | |
| 2006/0051222 A1 | 3/2006 | Lee et al. | |
| 2006/0185830 A1 | 8/2006 | Duan | |
| 2007/0145855 A1 | 6/2007 | Liu et al. | |
| 2007/0227707 A1 | 10/2007 | Machiroutu et al. | |
| 2007/0295477 A1 | 12/2007 | Mueller et al. | |
| 2008/0013283 A1 | 1/2008 | Gilbert et al. | |
| 2008/0038122 A1 | 2/2008 | Kikuchi et al. | |
| 2008/0239612 A1 | 10/2008 | Zhang et al. | |
| 2008/0239672 A1 | 10/2008 | Ghoshal et al. | |
| 2009/0009968 A1 | 1/2009 | Hongo | |
| 2010/0025010 A1 | 2/2010 | Cipolla et al. | |
| 2011/0162821 A1 | 7/2011 | Manzer | |
| 2013/0297074 A1 | 11/2013 | Todor et al. | |
| 2019/0072334 A1 | 3/2019 | Xiao | |
| 2019/0111862 A1 | 4/2019 | Dede | |
| 2019/0128271 A1 | 5/2019 | Campbell et al. | |
| 2019/0140493 A1 * | 5/2019 | Takahashi ............. | H02K 3/325 |
| 2019/0331019 A1 | 10/2019 | Wang | |

OTHER PUBLICATIONS

IDEX Corporation, "Drive Technology," 2018, pp. 1-2 (online), Retrieved from the Internet on Oct. 4, 2018 at URL: <micropump.com/technology_drives_technology.aspx>.

P Verma et al., "Design and Development of a Modular Valveless Micropump on a Printed Circuit Board for Integrated Electronic Cooling," Abstract, Jan. 16, 2009, pp. 1-4 (online), SAGE Journals, Retrieved from the Internet on Aug. 9, 2016 at URL: <journals.sagepub.com/doi/abs/10.1243/09544062JMES1315?journalCode=picb>.

Wikipedia, "Rim-driven thruster", available online at <https://en.wikipedia.org/wiki/Rim-driven_thruster>, Apr. 2017, 1 page.

Engineering ToolBox, "Pump Affinity Laws" available online at <https://www.engineeringtoolbox.com/affinity-laws-d_408.html>, 2003, 4 pages.

* cited by examiner

AXIAL FLOW PUMP WITH REDUCED HEIGHT DIMENSION

BACKGROUND

Pumps are used in cooling systems for computer equipment that are to be liquid-cooled. It is desirable for pumps to provide high flow and high pressure in such environments, yet have a small footprint and overall volume to minimise take-up of room in crowded server racks and other applications where space is a premium requirement. In addition, especially in the environment of electrical equipment, it is desirable to minimise the risk of leakage of coolant medium.

BRIEF INTRODUCTION OF THE DRAWINGS

Examples of the disclosure are further described hereinafter with reference to the accompanying drawings, in which.

DETAILED DESCRIPTION

A microaxial pump in accordance with the present disclosure has particular application in the environment of electronic equipment, including server cabinets, where there is an increasing tendency towards employing liquid cooling arrangements to manage the cooling requirements of such equipment.

Rapidly increasing device power are driving demand for increased water flow rate for water-cooled High Performance Computing (HPC) racks. These device powers are driving extremely dense server/chassis/rack designs, so that space is now at a premium. Traditional centrifugal pump designs are hitting a limit in their ability to scale with the increasing pumping needs, and are more expensive and space-inefficient.

IT systems are tending towards near 100% liquid-cooling, with near 100% rejection of the IT system heat directly to the fluid. In lockstep with these events, future server/chassis designs will need extensive coolant flow due to large increases in device/server power, as central processing units (CPUs) approach 300 W, supporting dual in-line memory modules (DIMMs) approach 16 W, graphics processing units (GPUs) approach 500 W, and compute devices with integrated high bandwidth memory (HBM) exceed 600 W.

Furthermore, increased facility fluid temperatures, lower device case temperature requirements and maintaining a tight range of temperatures are also driving demand for more flow at the server/chassis level. Traditional ways of delivering flow to IT systems are via row-based coolant distribution units (CDUs), but these methods are now challenged to meet the flow demands, while meeting pumping redundancy requirements. Row-based CDUs also impose long pumping distances with excessively large pipe sizes which incur height, cost, connection leak risks and space penalties on the precious data center floor. An alternative is rack-mounted CDUs, but these are already typically at 4 rack unit (Us) height in vertical size (44.5 mm in a typical industry-standard rack system), and roughly have 60-80 kW of cooling capacity. Rack CDUs are however improving and may achieve 125-200 kW capacity. Nevertheless, their challenge is flow capacity and staying within a 4 U size results in limited pump space as larger heat exchangers are required. The pumps need to deliver about 40 gpm of coolant flow and, if there is a failure with a pump, an entire rack may have to be shut down to replace the CDU. In any event, giving up 4 U of vertical space in the rack is already unattractive and these designs will have to scale in height or quantity to achieve increases in flow, as well as use colder facility fluid, as rack powers approach and are planned to exceed 200 kW per rack. Thus the current means of delivering flow are already space-inefficient, and the present disclosure is concerned with addressing some of these issues.

A microaxial pump according to the present disclosure is designed to deal with the aforementioned capacity and footprint issues by enabling incorporation of a pump into the space challenged server/chassis, by, for example, fitting within areas already "zoned" for cooling infrastructure such as the tubing network ingress/egress of a server unit.

A micro pump according to the present disclosure may be specifically designed to fit in a variety of places with the pump (or multiple pumps) packaged in a form factor that can easily merge into designated volumes. These areas may be the industry standard sized bays to provide improved resiliency and easy service function. Micro axial pumps according to the present disclosure may be deployed in a rack and deliver between them potentially over 60 gpm of coolant flow. Moreover, if one pump fails, there can be other pumps in each server on standby to continue the flow requirements because of the size of the pumps.

Traditional axial pumps comprise an impeller that is inside a liquid channel and connected to a shaft, the shaft being driven by a motor external to the liquid channel. The complication of making a water-tight motor is addressed by locating the motor externally of the fluid that is being pumped. However, because the shaft extends through a wall of the liquid channel in such examples, an effective shaft seal must be provided at the point that the shaft penetrates the wall, which creates a possible point-of-failure and increases the complexity and cost of the pump. There are of course benefits to having the motor arranged externally, for example to provide easy access for service issues, but the leak risk and overall construction and space efficiency are not realistic or safe solutions for miniaturization to package into a computer server, for example.

Another alternative pump architecture is a Rim-driven pump. Rim-driven pumps do not rely on a shaft to drive the impeller. The impeller is instead directly driven by a circular motor surrounding the circumference of the impeller. The motor is water-tight, and the entire assembly is submerged in the liquid that it is moving. There are a variety of advantages to not having a shaft in the RIM design, such as reduction of debris entrapment. These solutions are typically rather large and found on large water craft.

A third axial pump design configuration is, in fact, a mixed flow arrangement because the fluid path is not truly axial. In this arrangement, the motor may be positioned within the working fluid and mounted along the rotating axis of the impeller. In that case, fluid has to move around the motor at an angle to the pump axis. This motion classifies it as a mixed flow pump. Nevertheless, such an arrangement provides pressure capability and efficiencies that are capable of scaling from large industrial equipment to small heart pumps.

In an embodiment, a microaxial pump in accordance with the present disclosure incorporates a combination of features that have the advantages of axial pumps of the prior art, without some of the disadvantages.

For example, in one arrangement, a micro-axial pump has a housing defining a bore. Spokes may depend from each end of the bore to mount a central bearing journal. An impeller may have an axle journaled for rotation about a longitudinal axis of the bore between the bearing journals. A hollow cylindrical permanent magnet sleeve may be mounted on the ends of vanes of the impeller, close to the bore of the housing for rotation with the impeller in the bore. A stator may be outside the housing and include a coil arrangement to impart a variable magnetic field through the bore to interact with the magnetic field of the magnet sleeve and drive the magnet sleeve and impeller to rotate about the longitudinal axis and drive fluid along the housing bore.

The stator may comprise two C-shaped lamination stacks disposed on opposite sides of the housing. The axial length of the lamination stacks may correspond with the length of the magnet sleeve. More than one impeller may be arranged in the magnet sleeve. Each lamination stack may have a coil winding of the coil arrangement so as to define two pole teeth of each lamination stack one at each end of the C-shaped section. The coil may in this event be wound around a waist or middle section of the C-shaped lamination stack. The pole teeth of each lamination stack may be disposed at spaced or adjacent sectors of the bore and provide magnetic poles of opposite sense with respect to one another. At least four magnetic poles may thereby be arranged around the bore. Nevertheless, the bulk of each lamination stack and their associated coil windings may be disposed to either side of the bore so that the housing around the bore accounts for most of a height dimension of the pump, in a direction transverse to a width dimension including the lamination stacks and coil windings. This arrangement enables the flow cross section of the pump to be maximised, while minimising a dimension of the pump, in its height, for example. Furthermore, with the driving elements of the pump being outside the bore, not only is a potential dynamic leak path eliminated (because no rotating element penetrates the fluid path, and neither does any electrical connection), but also the flow section of the bore is not compromised by inclusion of the pump motor (except with respect to the permanent magnet sleeve) in the pump bore.

Supporting the impeller in the bearing journals disposed on spokes depending from the housing bore facilitates balancing of the impeller to permit faster rotation speeds, in the range 20-30,000 revolutions per minute, without excessive vibration. There may be three spokes, evenly spaced around the longitudinal axis, to provide effective support for the impeller and magnet sleeve without unduly interrupting the flow path through the bore of the housing.

There may be only two lamination stacks and thereby only four pole teeth, which, in that event, are arranged at each of quadrant sectors around the bore. Thereby, opposite pole teeth at opposite quadrants may be arranged at any moment to have the same magnetic polarity, opposite to the magnetic polarity of the other pair of opposing pole teeth.

The axial length of the lamination stacks is not limited and can be arranged as long as required to achieve a desired power of the pump. Indeed, pumps may be provided in series, or in parallel, to permit adjustment of pump pressure and/or flow requirements. The direction of rotation of impellers in adjacent pumps may be different to provide the advantages of contra-rotating impellers, at least one of which may be the reduction of spiralling motion of the driven fluid, possibly reducing turbulence and improving axial flow rate.

Each lamination stack may itself comprise two separate lamination stack parts fitted together with mating projections around which the coil winding is disposed and to conduct the magnetic flux generated by the coil to the pole teeth. Each coil winding may comprise two coil winding elements. The lamination stack parts may comprise lamination plates of identical shape bonded together, whereby each lamination stack part has an identical section, and each lamination stack has an identical section.

In one embodiment according to the disclosure, an axial flow pump may comprise a housing, which may be fluid sealed, having a bore and a fluid inlet and fluid outlet at each end of the bore. A magnet sleeve may be supported for rotation in the bore and defining a longitudinal axis of the pump, a permanent magnet being mounted on the magnet sleeve. A first impeller may be supported on the magnet sleeve for rotation with the magnet sleeve about the longitudinal axis to drive fluid in a flow along the bore of the housing from the fluid inlet to the fluid outlet, the flow being in the direction of the longitudinal axis, through the first impeller. A stator may be mounted around the housing and comprise a coil arrangement adapted to impart a varying magnetic field through the housing to drive the magnet sleeve about the longitudinal axis.

The stator may comprise a lamination stack which is asymmetric in section across the longitudinal axis, having a long dimension in a first direction and a short dimension in a second direction transverse to the first direction, and the diameter of the bore may be at least 70% of the short dimension of the section. It may be 80% of the short dimension of the section. It may be 90% of the short dimension of the section.

The lamination stack in the short dimension may define a total height of the pump, excluding the fluid inlet and fluid outlet. However, it is even feasible for the height dimension to be determined by the housing around the bore, although this will compromise to some extent the flux linkage provided by the lamination stack with the bore and the magnet sleeve, potentially adversely impacting the balance and efficiency of the motor arrangement of the pump. An aspect ratio of the pump is the ratio of the length of the magnet sleeve with respect to its diameter. The aspect ratio of the pump may be at least 1. It may be at least 1.5. It may be 2, or more.

A first radial spoke may depend from the housing into the bore and mount a first bearing journal at the longitudinal axis. The magnet sleeve may have an axle supported for rotation in the first bearing journal. The first radial spoke may comprise a set of first radial spokes, spaced around the longitudinal axis, each first spoke of the set depending from the housing into the bore and mounting the first bearing journal at the longitudinal axis. This provides greater stability to the spoke.

A second radial spoke may be provided, depending from the housing into the bore and mounting a second bearing journal at the longitudinal axis, the axle being supported for rotation in and between the first and second bearing journals.

In an embodiment, a second impeller is supported in series with the first impeller on the magnet sleeve for rotation with the magnet sleeve about the longitudinal axis to drive fluid along the bore of the housing from the fluid inlet to the fluid outlet. The magnet sleeve may be in two or more lengths, each length mounting a single impeller, or more than one impeller, with one or more intermediate spokes depending from the housing and supporting an intermediate bearing journal that mounts one end of the axles of impellers on either side of the intermediate spoke or spokes.

The housing may comprise an inlet part and an outlet part clamped together. They may be sealed with respect to one another by an annular gasket seal.

The coil arrangement may be disposed in a coil region of the lamination stack, the coil arrangement lying within the confines of the short dimension, the coil region being to one side of the housing in the direction of the long dimension.

The coil arrangement may be a first elongate coil providing a magnetic field whose magnetic plane through the coil is parallel the longitudinal axis. The coil arrangement may comprise first and second coils, and the coil region comprises first and second coil regions, the first coil being disposed in the first coil region on a first side of the housing and the second coil being disposed in the second coil region on a second, opposite side of the housing.

In an embodiment, the long dimension is at least 1.5 times the short dimension of the section. The stator may be substantially rectangular in section.

In an embodiment, the lamination stack comprises a first C-shaped lamination stack and the coil arrangement comprises a first coil associated therewith and a second C-shaped lamination stack and a second coil associated with the second C-shaped lamination stack.

The housing comprises, in one embodiment, an inlet part and an outlet part which are clamped together and sealed with respect to one another by an annular gasket seal. The clamping of the inlet part and the outlet part may clamp the first and second C-shaped lamination stacks together and to the housing. A seal may not be required where the pump is immersed in the coolant or other fluid being pumped.

The lamination stack may comprise detent bores extending therethrough parallel the longitudinal axis, and the inlet and outlet parts may comprise detent pegs engaging the detent bores and locating the lamination stack against the inlet and outlet parts when the inlet and outlet parts are clamped together.

The inlet and outlet parts may comprise mutually interengaging arms having hook elements that snap into engagement around the lamination stack to retain the inlet and outlet parts together. Other ways of locating the lamination stack and joining the inlet and outlet parts are not excluded.

The inlet part may include a first end plate having the fluid inlet and the outlet part may include a second end plate having the fluid outlet, one of the first and second endplates comprising a tubular member defining the bore and passing through the stator, the other of the first and second endplates comprising a socket against which an open end of the bore mates when the housing is assembled. The first and second endplates may have inter-engaging arms to effect the clamping, the first and second endplates and the tubular member securing the stator to the housing.

In an embodiment, the magnet sleeve is a tubular molding of permanent magnet material. The impeller may comprise a moulded tubular sleeve, optionally of plastics material, from which impeller vanes depend and are connected to the axle.

The tubular molding of the magnet sleeve, and the molded tubular sleeve from which impeller vanes depend, may be separate components fitted together so that they are rotationally fixed with respect to one another about the longitudinal axis.

In another embodiment, the present disclosure provides a housing having a bore, a cylindrical permanent magnet within the housing bore, at least one impeller inside the permanent magnet and adapted to cause fluid to flow within the cylindrical permanent magnet, wherein the at least one impeller is affixed to the permanent magnet and the permanent magnet is configured to rotate in the bore around its longitudinal axis; and a motor lamination stack surrounding the cylindrical permanent magnet; wherein the motor lamination stack is formed substantially as a cuboid extending in a width and height direction perpendicular to the axis of rotation of the cylindrical permanent magnet, and wherein that the diameter of the bore is at least 70% of the dimension of the cuboid in the height direction.

The at least one impeller may comprise a shaft along the axis of rotation of the cylindrical permanent magnet.

The motor lamination may comprise a coil wherein the coil is configured to be energized and to create a rotating magnetic field in the lamination stack to rotate the cylindrical permanent magnet around its longitudinal axis.

In one embodiment, the motor lamination stack has an axial length equal to or greater than the diameter of the cylindrical permanent magnet.

The pump may be configured to operate with a pressure of 2 psid and a speed of 20 to 30 k.

Example design targets for a microaxial pump according to the present disclosure may include:

To cool a server using 36 C fluid to extract 6000 W of heat.
Flow: 1-3 gpm
Pressure: 2-5 psid
Torque: 4 mNm max
Speed: 20-30 k rpm
Fluid Power requirement: 1-2 W
Resulting Input Power: 2-7 W
Impeller Efficiency: 60%
Motor Efficiency: 80%
Fluid: water or 25% propylene glycol
Variable Speed In one application, a micro-axial pump in accordance with the disclosure is mounted on a cold plate of computer equipment, such as a server, to be cooled, wherein the pump supplies coolant from a cool supply to the cold plate. The lamination stack may contact the cold plate and transfer heat that the pump generates in the lamination stack into the cold plate, which thereby serves not only as a heat sink for components of the server, but also for the pump itself.

In an embodiment, a compound pump is provided, comprising two pumps as defined above, wherein the fluid outlet of a first of the two pumps comprises the fluid inlet of a second of the two pumps. This series connection of two pumps has the effect of increasing the pressure of a single pump. The impellers of each pump may be configured to rotate in opposite directions with respect to one another. This has the effect of a downstream impeller mitigating the rotation of the coolant fluid imposed by an upstream impeller, and hence improving the efficiency of the compound pump.

In an alternative embodiment, a compound pump may comprise two pumps as defined above, wherein the fluid inlets of each pump are interconnected and connected to a compound pump fluid inlet, and wherein the fluid outlets of each pump are interconnected and connected to a compound pump fluid outlet. In this case, the pumps are connected in parallel and can increase flow rate.

Multiple pumps according to the disclosure may be packaged in a small form factor (SFF) hard drive volume, having 15 mm in height. This packaging allows for hot swappability of the pump package. Utilizing different fittings to link pumps with elbows, T's, etc., the pumps may be configured to support parallel or serial flow, as may be desired for performance, resiliency, etc.

In another embodiment, an axial flow pump according to the disclosure comprises a housing, which may be sealed, having a bore and a fluid inlet and fluid outlet at each end of the bore, a magnet sleeve, supported for rotation in the bore and defining a longitudinal axis of the pump, a permanent magnet being mounted on the magnet sleeve, a first impeller, supported on the magnet sleeve for rotation with the magnet sleeve about the longitudinal axis to drive fluid in a flow along the bore of the housing from the fluid inlet to the fluid outlet, the flow being in the direction of the longitudinal axis, through the first impeller. A stator may be mounted around the housing and comprising a coil arrangement adapted to impart a varying magnetic field through the housing to drive the magnet sleeve about the longitudinal axis.

The pump may have a width in a first direction perpendicular to the longitudinal axis and a height in a second direction perpendicular to the longitudinal axis and to the first direction. The stator may comprise a lamination stack on which the coil arrangement is mounted, the coil being disposed in a coil region of the lamination stack. The coil region may be defined as a section of the lamination stack, in a plane perpendicular to the longitudinal axis, and being the area of the lamination stack that is encompassed by the coil passing through the section. The coil region may be located, with respect to the longitudinal axis, beyond a width tangent line of the bore, the width tangent line being parallel to the second direction.

The coil region may be within the confines of height tangent lines of the bore, the height tangent lines being parallel to the first direction.

Control of the pumps may be effected in a variety manners, including via coolant fluid pressure, temperature, critical device temperature, critical device power consumption, and projected workload. The motor control circuit may be disposed on printed circuit assembly (PCA) mounted on the inlet or outlet parts of the pump. This circuit may be connected to an overall control system in a variety of ways depending on application goals and location. That may include a wire harness manually inserted. However, the pump may be incorporated into a "hot plug" tray assembly, in which event power and signal links may be blind-mated at the same time fluid connections are made.

Advantages to be realised to a greater or lesser extent relative to the state-of-the-art include:

For a given pump bore diameter, compared with an impeller mounted directly on a motor within the bore, a larger blade surface area for the impeller is achieved, permitting lower speed, reduced noise and power, or greater flow and pressure with similar speed, noise and power.

External motor reduces leak risk inherent to the design of some axial pumps—there is no wire or shaft penetration through the fluid barrier.

External motor eliminates motor immersion damage concerns.

Wide vs high motor provides for high performance but low profile.

Long vs short motor provides for high torque and high efficiency.

Long axial impellers not competing for space with a motor allows for large flow capacity.

Shaft mounting of the impeller for better support, and hence better balancing, higher speed performance and longer life with less vibration Small size allows for placement in many different locations in the fluid network.

External motor is generally lower cost than miniature internal axial motor when considering end to end impact—that is, materials, construction, test, reliability, etc.

Figure 1:
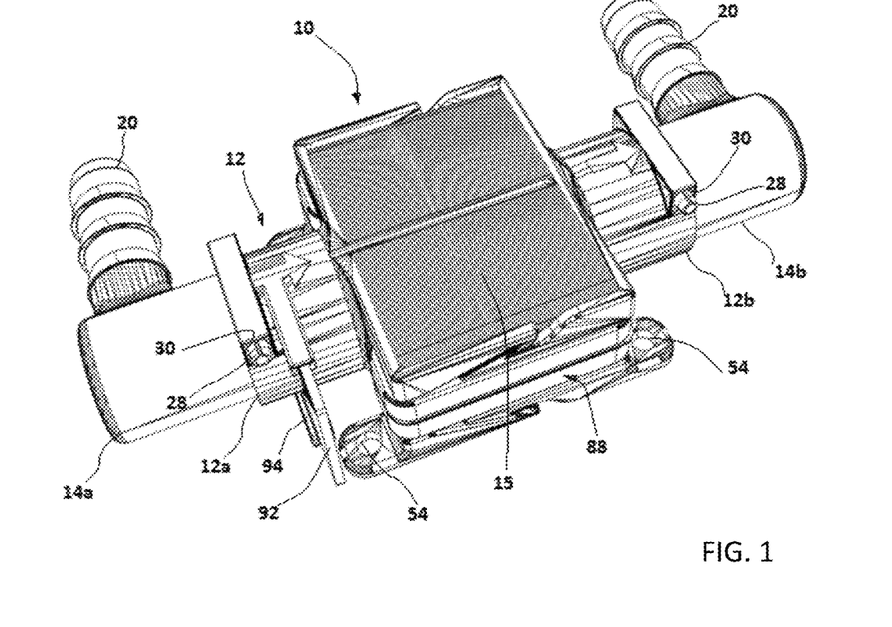
FIG. 1 shows a perspective view of a microaxial pump in accordance with the present disclosure.
Figure 2:
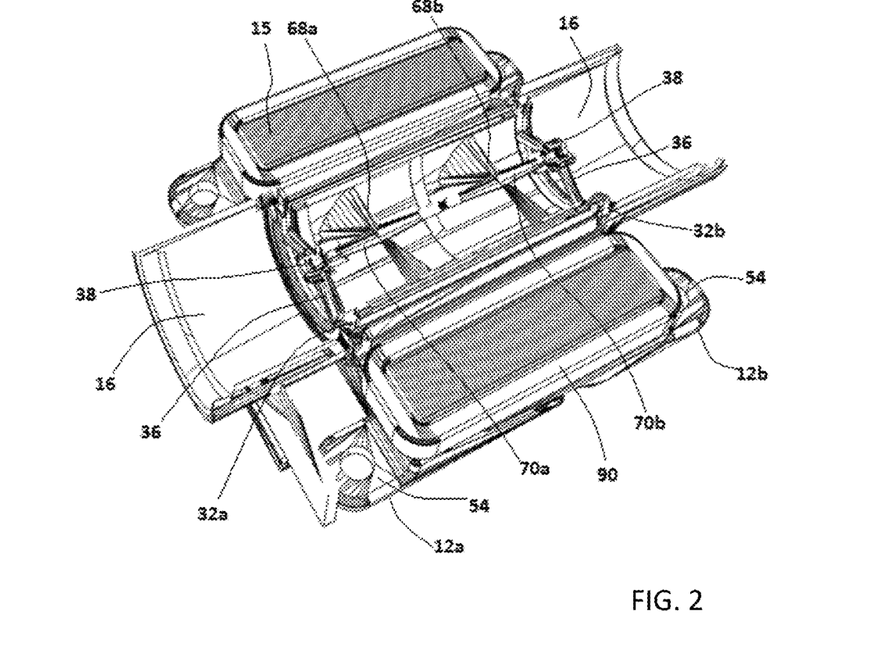
FIG. 2 shows a perspective view of a plan section of the pump of FIG. 1.
Figure 3:
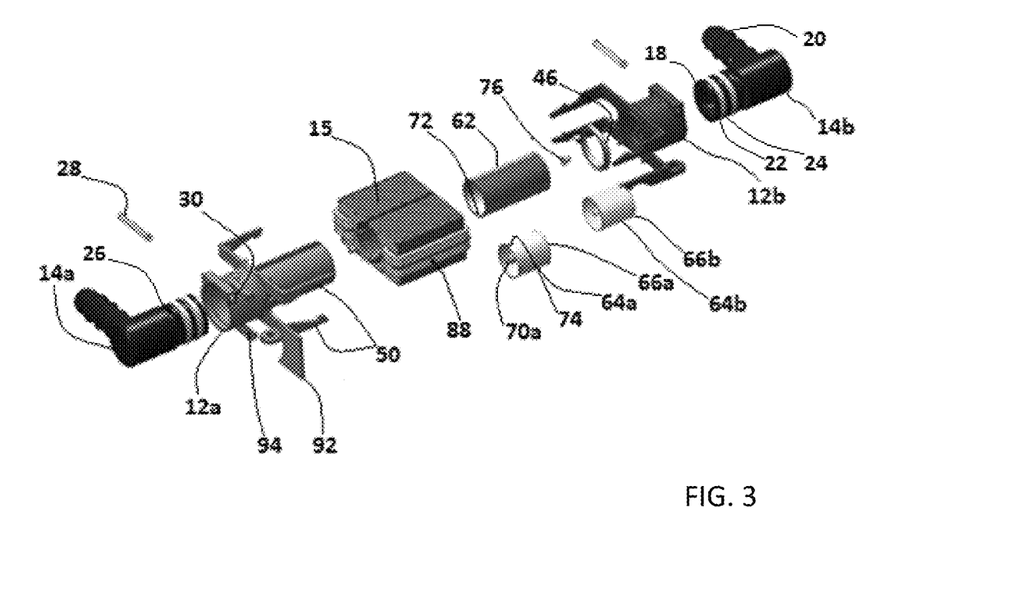
FIG. 3 shows an exploded view of the pump of FIG. 1.

With reference to FIG. 1, FIG. 2 and and FIG. 3, a pump 10 according to an embodiment of the present disclosure comprises a housing 12 comprising an inlet part 12a and an outlet part 12b, a fluid inlet 14a communicating with the inlet part 12a and a fluid outlet 14b communicating with the outlet part 12b. The inlet and outlet parts 12a,b may each have a cylindrical socket 16 adapted to receive a plug 18 of the inlet (or outlet) 14a,b and be provided with one, two or more circumferential grooves 22 to receive O-ring seals 24. The plug 18 of the inlet (or outlet) 14 may thereby be sealed to the socket 16, whilst permitting rotation of the inlet/outlet 14 within the socket 16. The inlet/outlet 14 may include a right-angle connector 20, whereby the direction of connection of tubing (not shown) attached to the connector and supplying coolant fluid to, or being delivered by, the pump 10 may be adjusted. However, in other embodiments, the connector 20 may be arranged at other angles with respect to the plug 18, including in line therewith. The plug 18 may be retained in the socket 16 by any convenient means, one of which comprises the plug having a further circumferential groove 26 adapted to receive a lock pin 28 disposed in a chordal passage 30 arranged across entrances to the inlet and outlet parts 12a,b.

Figure 4A:
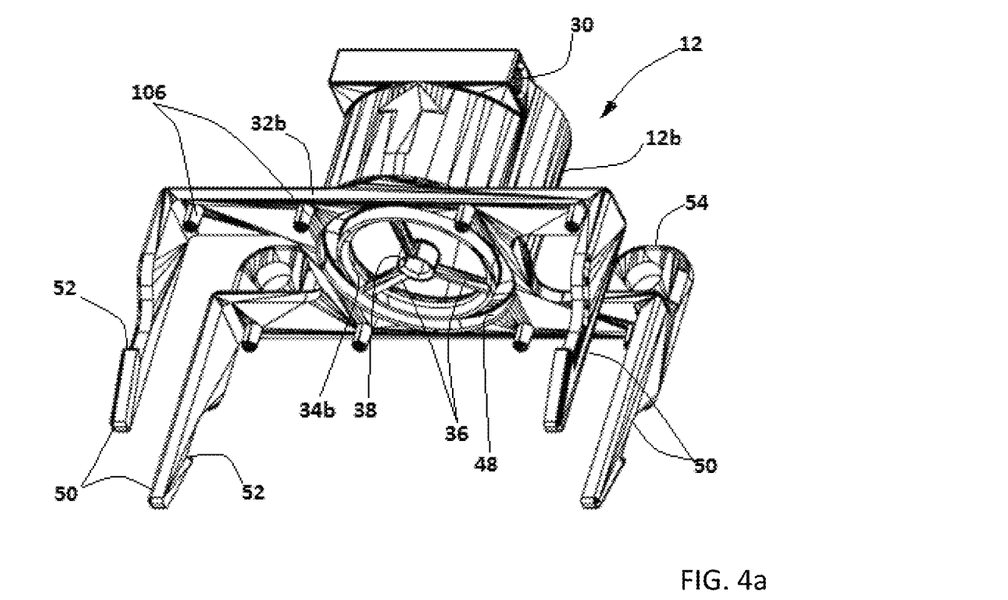
FIGS. 4a, 4b and 4c show respectively an inlet part, an outlet part and a seal gasket forming a housing of the pump of FIG. 1.
Figure 4B:
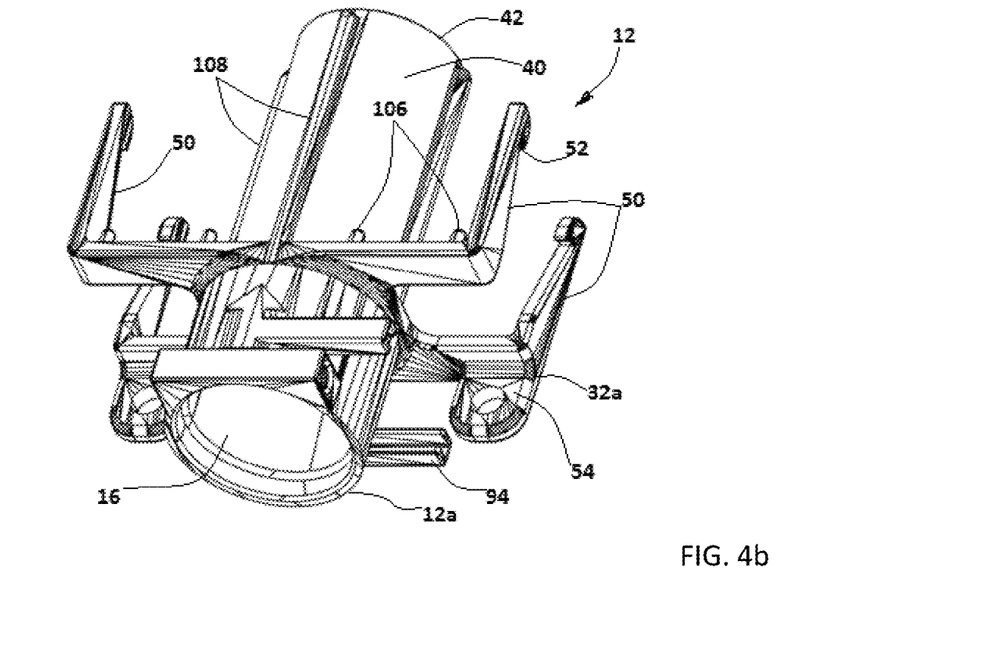
Figure 4C:
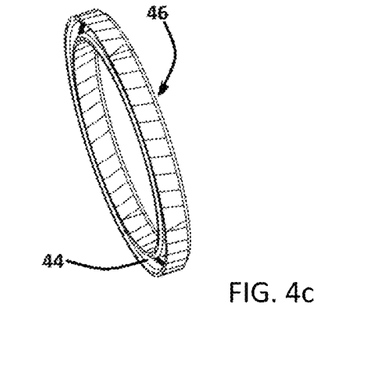

With reference to FIGS. 4a, 4b and 4c, the inlet and outlet parts 12a,b, when connected together form the housing 12. Each housing part 12a,b has an endplate 32a,b including a bore 34a,b communicating with the socket 16. Each bore 32,a,b has inwardly projecting spokes 36, terminating at a bearing journal 38. There may be one, two, three or more spokes 36. One of the endplates includes a projecting cylindrical tube member 40 which, in the embodiment of pump illustrated, is on, and part of, the end plate 32a of the inlet part 12a. The tube member 40 terminates in an annular lip 42 adapted to be received in a circumferential channel of a gasket seal 46 (see FIG. 4c). The gasket 46 is adapted to be received in a circumferential groove 48 around the bore 34b of the end plate 32b of the outlet part 12b. When the two housing parts 12a,b are interconnected and pressed together a sealed through bore, comprising the sockets 16, bores 34a,b and the tube member 40, is created. Instead of a gasket seal, however, the annular lip 42 could be sealed with an adhesive, for example, directly within the circumferential groove 48, thereby also fixing the inlet and outlet parts together. Each endplate 32a,b has projecting arms 50, provided with hooks 52, adapted to snap into engagement with each other, urging the two housing parts into mating engagement and squeezing the gasket 46 between the tube member 40 and end plate groove 48 to effect the required seal between them. If the inlet and outlet parts are glued or otherwise bonded together, the arms 50 may be omitted or may not include the inter-engaging hooks 52. A gasket seal may be omitted if the pump is to be immersed in the fluid it is pumping. In that event, the fluid may be an electrically non-conducting dielectric fluid.

The endplates 12a,b also include mounting brackets 54 for attachment of the pump, when assembled, to attach the pump 10 to a desired substrate.

Figure 5:
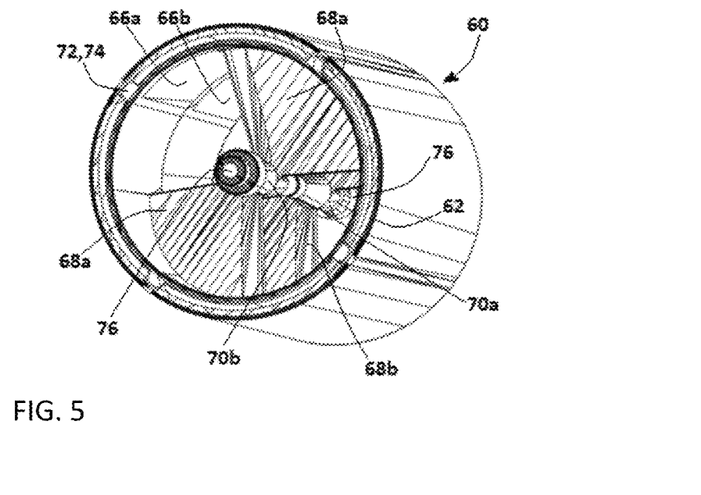
FIG. 5 is a perspective view of a magnet sleeve and impeller of the pump of FIG. 1.

With reference to FIG. 5, and also to FIG. 3 showing an exploded view of the pump 10, a magnet sleeve impeller assembly 60 comprises a magnet sleeve 62, incorporating a permanent magnet that may be compression moulded as a ring magnet to achieve tight tolerances. The assembly 60 further comprises a pair of impellers 64a,b that may also be injection moulded, of plastics material, each comprising an impeller sleeve 66a,b from which depend impeller blades 68a,b that each mount a respective shaft 70a,b. The impeller sleeves 66a,b are a close sliding fit in the magnet sleeve 62 and, when fully inserted therein, they abut one another. Respective notches 72 and detents 74 on the ends of the magnet sleeve 62 and impeller sleeves 66a,b, when interengaged, ensure that the two sleeves are rotationally fixed with respect to one another. The shafts 70a,b are received in respective bearings 76, adapted to be received in the bearing journals 38 in the two endplates, whereby, on assembly of the pump 10, the impeller assembly 60 is freely rotatably mounted within the cylindrical tube member 40 by each end plate 32a,b.

Figure 6A:
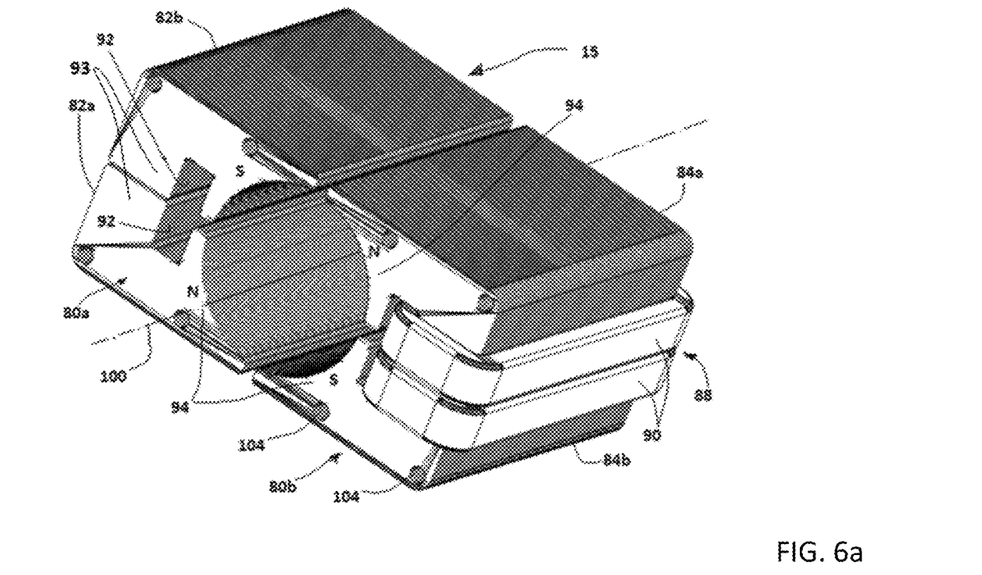
FIGS. 6a, 6b and 6c are respectively a perspective view of a lamination stack of the pump of FIG. 1, a cross-section through the pump perpendicular to its longitudinal axis, and a cross-section through a pump in accordance with an alternative embodiment.

The pump 10 further comprises a stator 15, best seen in FIG. 6a. The stator comprises two lamination stacks 80a,b that are C-shaped in section perpendicular to a longitudinal axis 100 of the pump. Together, the two lamination stacks 80a,b define a stator of substantially cuboid form, having a length, width and height where the width w (see FIG. 6b) is greater than the height h. The longitudinal axis 100 is also the rotation axis of the magnet sleeve impeller assembly 60, and passes through the bearing journals 38 in the endplates 32a,b of the inlet and outlet parts 12a,b. Each lamination stack 80a,b is itself in two parts 82a,b and 84a,b. Each plate of each lamination stack part 82/84a,b may be identical, resulting in identical lamination stack parts 82/84a,b and identical lamination stacks 80a,b.

The lamination stack parts 82/84a,b, when assembled as shown in FIG. 6a, captivate a coil arrangement 88, which itself may comprise two coil windings 90, each optionally mounted on a bobbin (not shown) and/or wrapped to retain the windings in position. The windings on the side 80a of the lamination stack 15 are omitted in FIG. 6a to show the cutout 92 in each lamination plate that serves to receive and locate the windings in each lamination stack part 82/84a,b. Each coil winding, when energised with electric current, serves to generate a magnetic field in its respective lamination stack part 82/84a,b, which in turn creates a magnetic pole at a tooth region 94 of each lamination stack part. Also, projections 93 of each lamination stack part 82/84a,b penetrate each coil winding 90 and link the magnetic flux generated by the coils 90 with the tooth regions 94. The polarity (N/S) of each pole tooth 94 can be alternated by alternating the direction of current in each winding 90. The magnetic field created by the coils 90 in the lamination stack 15 interacts with the magnetic field of the permanent magnet sleeve 62 to drive the magnet sleeve, and the connected impeller sleeves 66a,b, to rotate about the longitudinal axis 100, and thereby drive fluid in the bore of the impeller sleeves 64a,b from the fluid inlet 14a to the fluid outlet 14b.

Control of the alternating current in the coils 90 may be effected through a control board (PCA) 92, which conveniently may be retained in a slot 94 on the inlet housing part 12a. As with any permanent magnet motor, the speed of rotation can be adjusted by changing the voltage applied across the coils 90 and the frequency of alternation. Such control is within the skill of motor designers and requires no further elucidation herein. Parameters which drive the control may be determined in different ways depending on requirements, but include, for example, fluid temperature, power consumed and/or heat generated by the apparatus cooled by the coolant pumped by the pump 10.

Figure 6B:
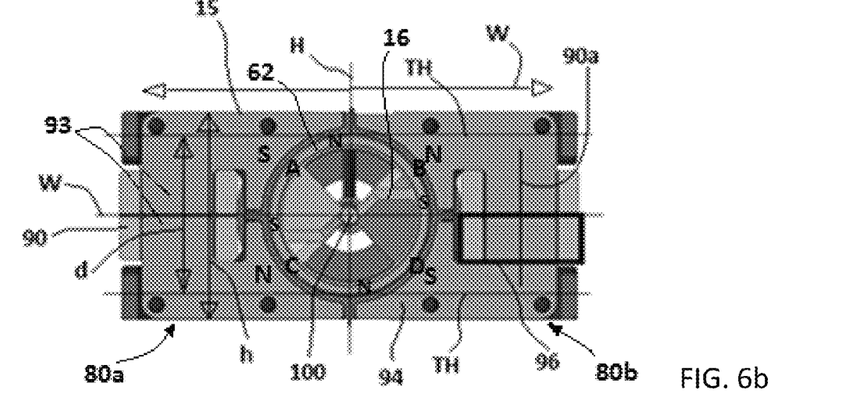
Figure 6C:
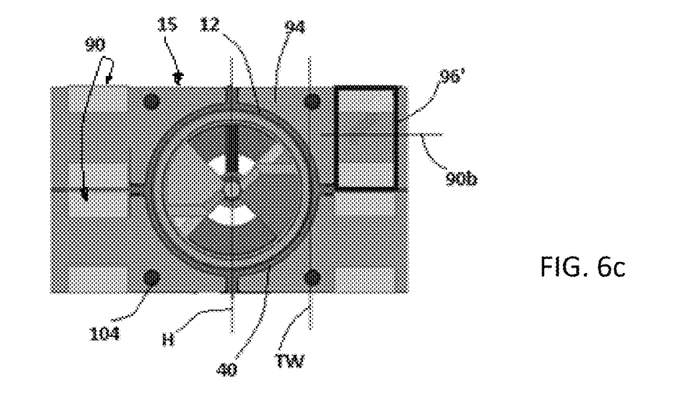

With reference to FIGS. 6b and 6c, longitudinal axis 100 has associated therewith a height plane H which is perpendicular thereto, and in which plane the height h of the pump may be defined. There is a corresponding width plane W that is perpendicular to both the longitudinal axis 100 and the height plane H. A width tangent line TW may be defined that is parallel the height plane H and is tangent to the bore of the housing 12 passing through the lamination stack 15.

With reference to FIG. 6b, it is to be noted that pump 10, in section (in a plane perpendicular to the longitudinal axis 100) is substantially rectangular and whose dimensions are determined mostly by the lamination stack 15. Indeed, the lamination stack 15, having a height h and a width w, accounts for the full height of the pump, excluding the fluid inlets 14a,b. The bore of the housing 12 has a diameter d and that diameter accounts for the majority of the height of the pump and may comprise at least 0.7 h, or 0.8 h, or 0.9 h. By maximising the diameter of the bore of the housing 12 with respect to the height h of the pump, the balance between flow capacity and pump size can be maximised, particularly with respect to height, which is one limiting factor in the environment of computer servers in a server rack.

That balance is achieved by shifting the location of the coil winding 90 of each lamination stack part 82/84a,b to a coil region 96 of the lamination stack part. The coil region of a lamination stack part 82/84a,b is defined as that area of the lamination, in the section perpendicular to the longitudinal access 100, that is occupied by the coil winding 90 in its passage through and around the lamination, as shown at 96 and 96' in FIGS. 6b and 6c respectively.

With reference to FIGS. 6b and 6c, the coil region 96 is located beyond the width tangent plane TW, whereby the height h of the lamination stack may be minimised without significantly compromising the magnetic linkage of the coil 90 to the tooth region 94 of the lamination stack.

Indeed, with reference to FIGS. 6a and 6b, the axis 90a of the coil winding 90 may be arranged parallel the height plane H whereby the coil region 96 is within confines defined by height tangent planes TH, being planes parallel the width plane W and tangent to the bore of the housing 12 passing through the lamination stack 15. However, the arrangement of the coil winding may be as shown in FIG. 6c where the coil axis 90b is arranged parallel to the width plane W.

In either case, the arrangement results in two C-shaped lamination stacks 80a,b that position stator teeth 94 at the ends of the C-shape at each of four quadrant sectors A, B, C and D (see FIG. 6b) of the housing bore 12 in which the magnet sleeve is disposed. The magnetic poles N/S of one lamination stack 80a are arranged opposite corresponding magnetic poles S/N of the other lamination stack, each magnetic circuit being driven by the respective coils 90 around a waist of the C-shaped lamination stacks 80*a,b* defined by the projections 93. The arrangement enables a balanced magnetic flux through the bore 12 to interact with corresponding poles N/S/N/S of the magnet sleeve 62 while disposing the bulk of the lamination stack 15 and associated coil arrangement 88 to either side of the housing 12. This enables a ratio of the height h to the diameter d of the bore to be maximised without compromising the efficiency or balance of the motor constituted by the lamination stack 15, coil arrangement 88 and magnet sleeve 62. Indeed, the ratio h/d may be as much as 0.9 before loss of magnetic linkage at the transitions between quadrants A/B and C/D begin to impact the smooth running and efficiency of the motor. Nevertheless, where such efficiency and smooth running was less important compared with maximising the bore diameter, the ratio h/d could be as much as 1.0.

The coil windings 90 are elongate, whereby the axes 90*a,b* of the windings define axis planes parallel the longitudinal axis 100 and being elongate they enable greater magnetic linkage to be effected whereby the power of the pump may be maximised without increasing the height of the pump. Indeed, the length is such that multiple impellers 68 may be disposed within the magnet sleeve 62 increasing the pressure drop achievable through the pump 10. Two impellers 68*a,b* are illustrated in the present embodiment, but more, or less, than two are feasible.

Returning to FIGS. 4*a*, 4*b* and 6*a*, each lamination plate of each lamination stack part 82/84*a,b* has through holes 104 whereby, when the individual plates are bonded or otherwise joined together to form each lamination stack part 82/84*a,b*, detent bores 104 are formed at each end of each lamination stack part. Corresponding detent pegs 106 are formed on the endplates 12*a,b* of the housing 12, to engage and locate the lamination stack parts 82/84*a,b* around the housing tubular member 40. The member 40 may include ribs 108 which further serve to locate the lamination stack. The arms 50 may also serve to embrace the lamination stack 15. As mentioned above, however, where the inlet and outlet parts are bonded or otherwise fixedly inter-connected, the arms 50 may be omitted entirely with the lamination stacks being located and secured to the pump body 12 by the inter-engaging detent bores 104 and detent pegs 106.

Figure 7A:
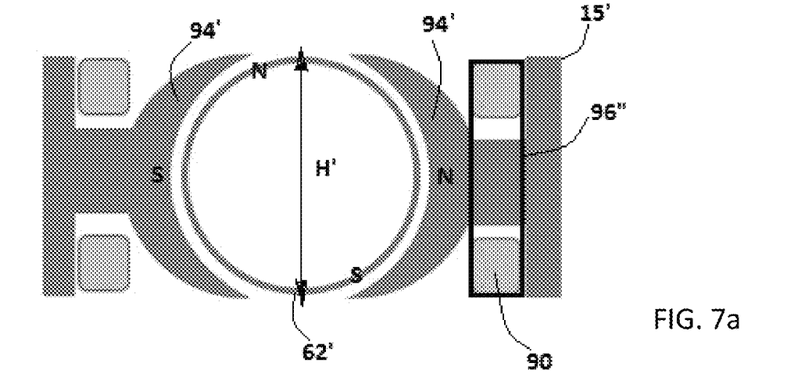
FIGS. 7a, 7b and 7c are respectively schematic illustrations of a two-pole and two eight-pole configurations of a pump according to the present disclosure.
Figure 7B:
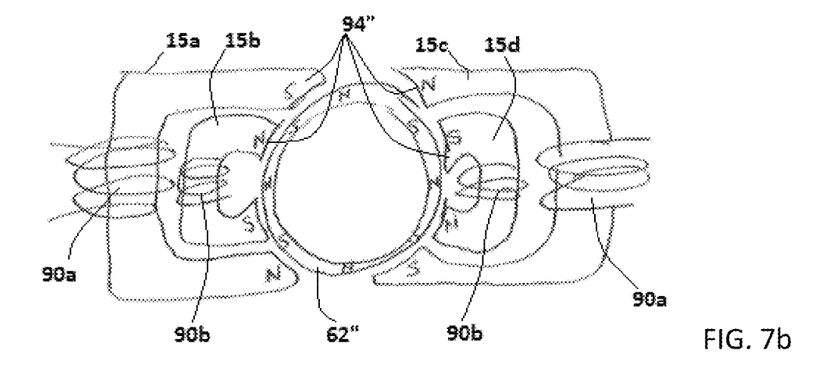
Figure 7C:
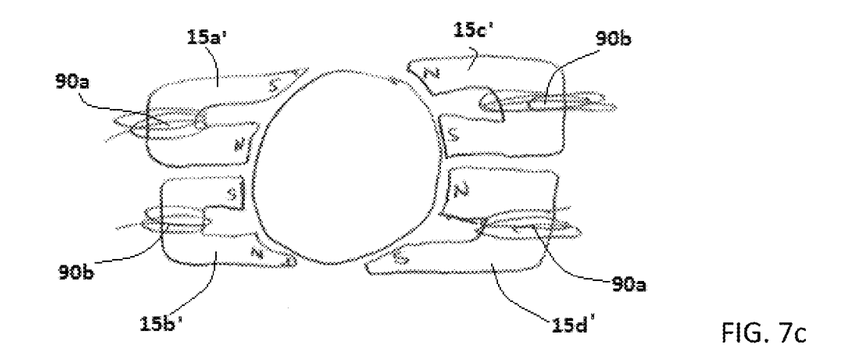

Turning to FIGS. 7*a*, 7*b* and 7*c*, whilst the pumps described with reference to FIGS. 1 to 6 are a four-pole stator arrangement, other stator pole arrangements are possible.

In FIG. 7*a*, a two-pole arrangement is shown, in which two lamination stacks 15' are generally C-shaped around the magnet sleeve 62' which in this case has two poles (N/S), the two lamination stacks providing two stator pole teeth 94' having opposing magnetic poles (N/S) depending on the energization of the coils 90, each disposed in a coil region 96" of each lamination stack 15'. The height H' of the resulting pump may be as little as the diameter of the housing (not shown in FIG. 7*a*). This pump motor arrangement will not be as smooth in operation as the four-pole motor but the cost-saving in terms of components and the height advantage may make it attractive in certain circumstances.

In FIG. 7*b*, an eight-pole arrangement is schematically shown, in which four lamination stacks 15*a*, 15*b*, 15*c* and 15*d* are provided, each defining two stator pole teeth 94". On pair (15*b*, 15*d*) of the stator lamination stacks are nested within the other pair 15*a*, 15*c* and each pair has an associated coil winding 90*a*,90*b*. Here, the magnet sleeve 62" has itself eight poles of magnetic polarity (N/S) and the arrangement provides for very smooth operation, although it does require faster current-switching arrangements for the coils 90*a*,90*b* for a given speed of rotation, compared with the two-pole or four-pole arrangements described above. Furthermore, because the stator teeth 94" benefit from an even distribution around the magnet sleeve 62", there is greater need for some lamination height above and below the body resulting in a smaller ratio of pump bore diameter to pump height than is achievable with the two-pole arrangement described above.

In FIG. 7*c*, an alternative eight-pole arrangement is illustrated schematically, where the four lamination stacks 15*a'*, 15*b'*, 15*c'* and 15*d'* are not nested within each other but disposed one pair 15*b'*, 15*d'* below the other pair 15*a'*, 15*c'*.

Figure 8:
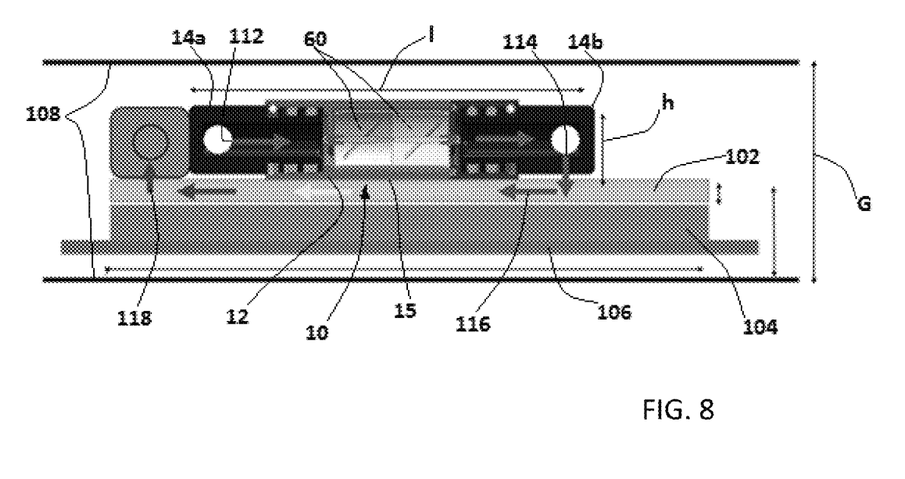
FIG. 8 is a side view of the pump of FIG. 1, in section, mounted on a CPU in a server.

With reference to FIG. 8, a pump 10 according to the present disclosure is shown mounted directly onto a central processing unit (CPU) channel plate 102, above a CPU 104, whereby heat generated by the CPU, and distributed to the channel plate, may be communicated with coolant fluid 112 drawn into inlet 14*a* of the pump 10. The fluid is driven through the pump and exits at 114 through outlet 14*b*, into and along channels 116 in the cold plate 102 (by connections, not shown), and into a receptor circuit 118 for disposal. The coolant not only extracts heat generated by the CPU 104, but also, through direct contact with the lamination stack 15, extracts heat generated by the pump 10 in the lamination stack 15. Indeed, the mounting brackets 54 may be arranged flush with the bottom surface of the lamination stack 15 for this purpose. The CPU 104 is mounted on a circuit board 106 within a standard server case 108. Such a server case has a height G of about 43 mm to fit in a standard server rack system. The pump may have a height h of about 15 mm and a length l of about 70 mm (including its fluid inlet/outlet 14).

Using the principle of a rim-driven impeller, with the motor structure not within the fluid, reduces the risk of a leak occurring, as there is no wire or shaft penetration through the fluid barrier. Only one seal (gasket 46) is required between the housing parts 12*a,b* and that is both non-moving and does not have elements (such as wires) passing through. (Seals are also provided, of course, between the fluid inlets/outlets 14 and the body 12.) However, unlike a rim-driven impeller, a pump according to the present disclosure does not utilize a full 360 degree motor around the pump. Instead, the present arrangement makes the bulk of the motor "wide". This maximizes the impeller diameter and keeps the overall design height smaller to fit in more places. Furthermore, retention of a shaft or axle 70*a,b* of the impeller and magnet sleeve in a bearing structure 76,38,36 provides better support for the impeller. This allows good balancing of the impeller and magnet sleeve assembly, which in turn allows higher speed performance of the pump, and longer life with less vibration. The pump according to the present disclosure also utilizes a long axial flow length which, like axial pumps with the motor within the flow, achieves a powerful motor, providing relatively high-performance torque, high-performance flow, and high-pressure capability. Unlike such pumps, however, a pump according to the present disclosure is not impeded by the motor being disposed within the fluid being pumped.

A pump according to the present disclosure may fit in a variety of form factors suitable for deployment in a computer server environment, such as described above with reference to FIG. 8. However, other form factors are possible. For example, pumps may be doubled up, either arranged in parallel, to increase flow rate without increasing pressure drop, or they may be operated in series to increase both flow rate and pressure drop. In both series and parallel operations, they may be arranged to rotate their respective impellers in opposite directions, thereby to reduce swirl effects of the flow upstream of the pumps.

It is to be noted for example, in one embodiment not illustrated, that the inlet socket 16 on the inlet housing 12a could be replaced by a further tubular member 40 and additional rearward facing arms 50, whereby a second outlet part 12b (not shown) connects to the second tubular member 40 (not shown) encompassing a second lamination stack 15 to create two pumps in line.

Increasing device power is driving demand for increased coolant flow rate for High Performance Computing (HPC) racks. These device powers are also creating extremely dense server/chassis/rack systems, so that space within such systems is at a premium. Traditional centrifugal pump designs are unable to scale with increasing pumping needs, and are more expensive and space-inefficient. A microaxial pump according to the present disclosure addresses cost, capacity and space constraints to deal with the aforementioned capacity and footprint issues. By incorporating multiple pumps according to the present disclosure into a space-challenged server/chassis by harmoniously fitting within areas already "zoned" for cooling infrastructure, such as the tubing network ingress/egress of the server, the requisite cooling requirements may be met.

Any of the features of claims 2 to 17 of the attached claims may be combined with each other (unless mutually exclusive), and may be provided in the pumps claimed in claims 18, 19 and/or 20. A pump may include the characteristics of claims 1, 18 and 20.

The invention claimed is:

1. An axial flow pump comprising:
   a housing, having a bore and a fluid inlet and fluid outlet at each end of the bore;
   a magnet sleeve, supported for rotation in the bore and defining a longitudinal axis of the pump, the magnet sleeve comprising a permanent magnet;
   a first impeller, supported by the magnet sleeve for rotation with the magnet sleeve about the longitudinal axis to drive fluid in a flow along the bore of the housing from the fluid inlet to the fluid outlet, the flow being in the direction of the longitudinal axis, past the first impeller;
   a stator mounted around the housing and comprising a coil adapted to impart a varying magnetic field through the housing to drive the magnet sleeve about the longitudinal axis, wherein:
   the stator comprises a lamination stack which is asymmetric in section across the longitudinal axis, having a long dimension in a first direction and a short dimension in a second direction transverse to the first direction, and
   wherein the diameter of the bore is at least 70% of the short dimension of the section.

2. A compound pump comprising two pumps, wherein each of the two pumps is the axial flow pump according to claim 1, wherein the fluid outlet of a first of the two pumps comprises the fluid inlet of a second of the two pumps, and wherein the impellers of each pump are configured to rotate in opposite directions with respect to one another.

3. An axial flow pump according to claim 1, wherein a height of the pump, excluding the fluid inlet and fluid outlet, is the short dimension of the lamination stack.

4. An axial flow pump according to claim 1, wherein the axial pump is mounted on a coldplate of a component of a server to be cooled and supplies the coldplate with coolant, wherein the lamination stack contacts the coldplate whereby heat from the component and from the lamination stack is extracted by the coldplate.

5. An axial flow pump according to claim 1, further comprising
   a first radial spoke, depending from the housing into the bore and mounting a first bearing journal at the longitudinal axis; and
   a second radial spoke, axially spaced from the first radial spoke, depending from the housing into the bore and mounting a second bearing journal at the longitudinal axis, the magnet sleeve having an axle supported for rotation between the first and second bearing journals.

6. An axial flow pump according to claim 1, wherein a second impeller is supported in series with the first impeller on the magnet sleeve for rotation with the magnet sleeve about the longitudinal axis to drive fluid along the bore of the housing from the fluid inlet to the fluid outlet.

7. An axial flow pump according to claim 1, wherein the housing comprises an inlet part and an outlet part clamped together in an axial direction, and sealed with respect to one another by an annular gasket seal.

8. An axial flow pump according to claim 1, wherein the coil is disposed at a coil region of the lamination stack, the coil lying within the confines of the short dimension and being to one side of the housing.

9. An axial flow pump according to claim 1, wherein the coil is a first elongate coil providing a magnetic field whose magnetic plane through the coil is parallel the longitudinal axis.

10. An axial flow pump according to claim 1, wherein the stator is substantially rectangular in section.

11. An axial flow pump according to claim 1, wherein
    the housing comprises an inlet part and an outlet part clamped together in an axial direction, the inlet part including a first end plate having the fluid inlet and the outlet part including a second end plate having the fluid outlet;
    one of the first and second endplates comprises a tubular member defining the bore and passing through the stator, and the other of the first and second endplates comprises a socket against which an open end of the bore mates when the housing is assembled; and
    the first and second endplates have inter-engaging arms to effect the clamping, the first and second endplates and the tubular member securing the stator to the housing.

12. An axial flow pump according to claim 1, wherein the axial pump is a micro-axial pump packaged into a server.

13. An axial flow pump according to claim 1, wherein the lamination stack comprises:
    a first C-shaped lamination stack and the coil comprises a first coil associated therewith, and
    a second C-shaped lamination stack and the coil comprises a second coil associated with the second C-shaped lamination stack,
    wherein said first and second C-shaped lamination stacks are disposed one on either side of the housing bore.

14. An axial flow pump according to claim 13, wherein
    the housing comprises an inlet part and an outlet part clamped together in an axial direction; and
    the clamping of the inlet part and the outlet part clamps the first and second C-shaped lamination stacks together and to the housing.

15. An axial flow pump according to claim 14, wherein the lamination stack comprises detent bores extending therethrough parallel the longitudinal axis, and the inlet and outlet parts comprise detent pegs engaging the detent bores and locating the lamination stack against the inlet and outlet parts when the inlet and outlet parts are clamped together.

16. An axial flow pump according to claim 14, wherein the inlet and outlet parts comprise mutually inter-engaging arms having hook elements that snap into engagement around the lamination stack to retain the inlet and outlet parts together.

17. An axial flow pump comprising:
a housing, having a bore and a fluid inlet and fluid outlet at each end of the bore;
a magnet sleeve, supported for rotation in the bore and defining a longitudinal axis of the pump, a permanent magnet being mounted on the magnet sleeve;
a first impeller, supported on the magnet sleeve for rotation with the magnet sleeve about the longitudinal axis to drive fluid in a flow along the bore of the housing from the fluid inlet to the fluid outlet, the flow being in the direction of the longitudinal axis, through the first impeller;
a stator mounted around the housing and comprising a coil adapted to impart a varying magnetic field through the housing to drive the magnet sleeve about the longitudinal axis, wherein:
the pump has a width in a first direction perpendicular to the longitudinal axis and a height in a second direction perpendicular to the longitudinal axis and to the first direction;
the stator comprises a lamination stack on which the coil is mounted, the coil being disposed in a coil region of the lamination stack, the coil region comprising a section of the lamination stack in a plane perpendicular to the longitudinal axis, the coil region comprising the area encompassed by the coil passing through the section,
wherein the coil region is located, with respect to the longitudinal axis, beyond a width tangent line of the bore, the width tangent line being parallel to the second direction.

18. A pump according to claim 17, wherein the coil region is within the confines of height tangent lines of the bore, the height tangent lines being parallel the first direction.

19. An axial flow pump comprising:
a housing, having a bore and a fluid inlet and fluid outlet at each end of the bore;
a magnet sleeve, supported for rotation in the bore and defining a longitudinal axis of the pump, the magnet sleeve comprising a permanent magnet;
a first impeller, supported by the magnet sleeve for rotation with the magnet sleeve about the longitudinal axis to drive fluid in a flow along the bore of the housing from the fluid inlet to the fluid outlet, the flow being in the direction of the longitudinal axis, past the first impeller;
a stator mounted around the housing and comprising a coil arrangement adapted to impart a varying magnetic field through the housing to drive the magnet sleeve about the longitudinal axis, wherein:
the stator comprises first and second lamination stacks, the first lamination stack being disposed on one side of the housing, and the second lamination stack being disposed on the other, opposite side of the housing, the coil arrangement comprising a first coil on the first lamination stack and a second coil on the second lamination stack, the first and second lamination stacks each defining at least a first stator tooth arranged at a first sector of the bore, the first stator tooth of the first lamination stack being diagonally opposite, across the bore of the housing, the first stator tooth of the second lamination stack; and wherein
the magnet sleeve and the first and second coils are configured to be energised so that the first teeth on the first and second lamination stacks have a magnetic pole to drive a corresponding pole of the magnet sleeve in the same direction around said longitudinal axis.

20. An axial flow pump according to claim 19, wherein each of the first and second lamination stacks also define a second stator tooth arranged at a second sector of the bore, the second stator tooth of the first lamination stack being diagonally opposite, across the bore of the housing, the second stator tooth of the second lamination stack; and wherein
the magnet sleeve and the first and second coils are configured to be energised so that the first and second teeth on the first and second lamination stacks have a magnetic pole to drive a corresponding pole of the magnet sleeve in the same direction around said longitudinal axis.

21. An axial flow pump according to claim 20, wherein there are only two of said lamination stacks and the first and second stator teeth are arranged at adjacent quadrants of the bore.

22. An axial flow pump according to claim 20, wherein the first and second stator teeth are arranged at adjacent sectors of the bore.

* * * * *